Jan. 15, 1957  R. M. KULICKE ET AL  2,777,232
PICTURE FRAME
Filed Nov. 10, 1954
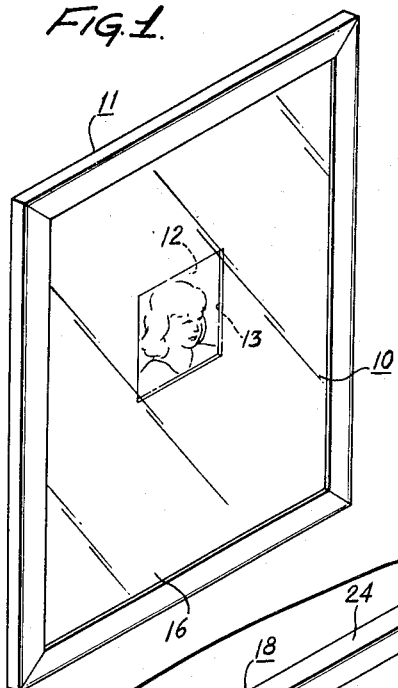
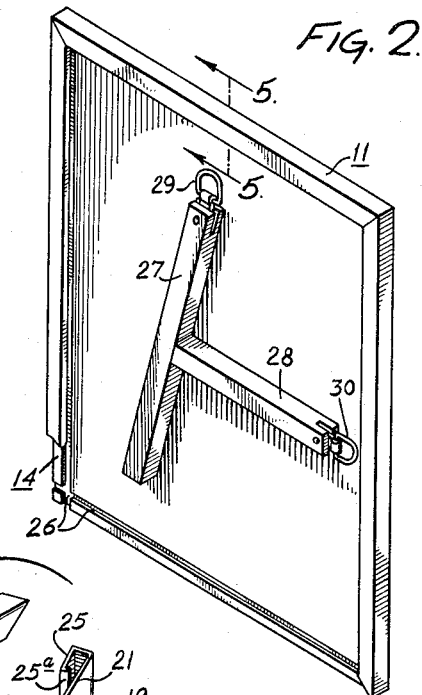
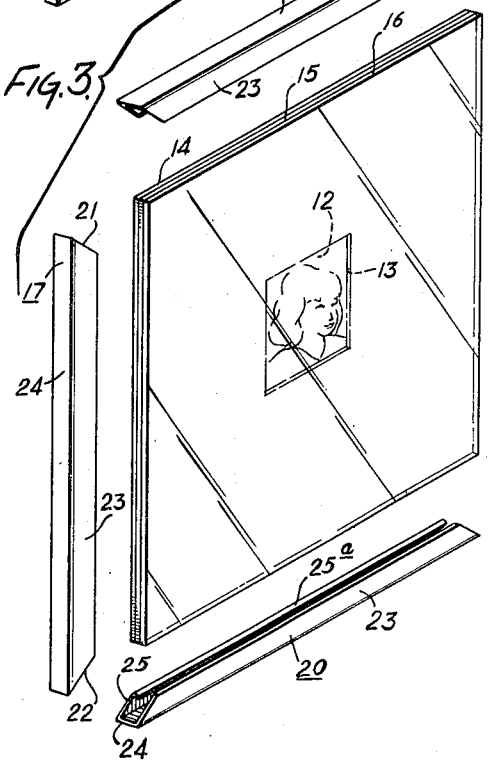
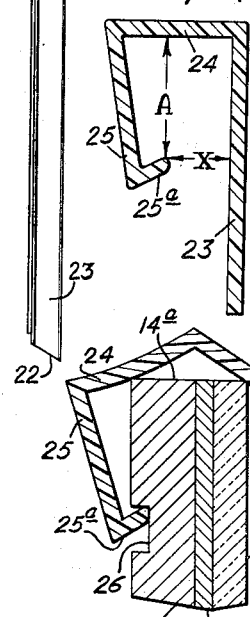
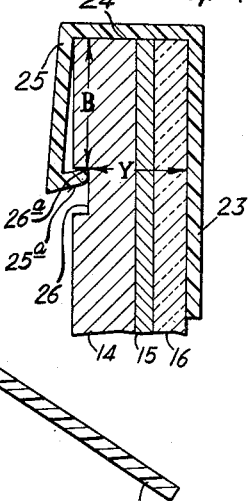
Inventors:
Robert M. Kulicke
John Wayne Jones
Howson & Howson
Attys.

United States Patent Office 2,777,232
Patented Jan. 15, 1957

2,777,232

PICTURE FRAME

Robert M. Kulicke and John Wayne Jones, New York, N. Y.

Application November 10, 1954, Serial No. 467,998

7 Claims. (Cl. 40—155)

This invention relates to picture frames and mountings.

In the past, a picture frame has been considered primarily as a support for a picture and its backing and the usual glass facing, and secondarily as an ornamental border for the framed picture mount assemblage. The framing of a picture has involved painstaking effort on the part of the person doing the work, and has necessitated the use of nails, tape, glue, etc. Generally speaking, the proper framing of a picture has been a task calling for the skill of an expert, and few users have been willing to undertake the task. Those who have done so have generally produced results expected from amateur effort.

The present invention is based upon a new and different concept of picture frames. In accordance with this invention a strong and rigid backing is made to serve as a support for the picture mount assemblage, and the frame is not relied upon as a support but is made to serve as a mechanical clasp for the entire picture mount assemblage and as a marginal decoration.

One object of this invention is to provide a picture frame and mount combination which can be assembled, disassembled and reassembled by the user with little effort and without the use of tools, or materials, thus avoiding expense to the user.

Another object of the invention is to provide such a combination which provides a dust-proof structure that precludes the entry of dust or foreign particles into the picture mount assemblage.

Another object of the invention is to provide a novel picture frame structure adapted for use in such combination.

A further object of the invention is to provide a picture frame which lends itself to good design and attractive appearance.

A further object of the invention is to provide a picture frame and mount combination that can be manufactured economically and sold at low cost.

In accordance with the invention, the picture frame comprises individual resilient frame elements adapted to be placed over the marginal portions of the picture mount assemblage, and provision is made for effecting latching engagement between each frame element and a rigid backing which is part of said assemblage. To this end, a latching surface or shoulder is provided on the rigid backing for each frame element, and a projection or detent is provided on each frame element to engage said surface or shoulder.

The preferred embodiment of the invention is illustrated in the accompanying drawing, wherein:

Fig. 1 is a perspective view of the assembled picture frame and mount from the front thereof;

Fig. 2 is a perspective view of the same from the rear, with the bottom frame element removed and with a portion of one of the side elements broken away;

Fig. 3 is an exploded view of the picture mount assemblage and frame elements;

Fig. 4 is a sectional view of one of the frame elements in relaxed condition;

Fig. 5 is a fragmentary sectional view taken on line 5—5 of Fig. 2; and

Fig. 6 is a similar view showing the manner of application and removal of one of the frame elements.

In Figs. 1 and 2, the picture mount assemblage is designated generally by reference numeral 10 and the picture frame is shown at 11. In the particular mount illustrated, the picture 12 is held between elements of the mount assemblage behind a window 13 in one of the elements.

Referring to Figs. 3 to 5, the picture mount assemblage 10 includes a strong and rigid backing 14, together with such other elements as desired to make up the complete picture mount. In the illustrated assemblage, the entire picture mount comprises the rigid backing 14, a relatively thin mat 15 which is provided with the window 13, and the usual glass front facing 16. It is to be understood that the picture may be placed directly on the mat and thus be held between the mat and the glass front facing. In this case, the window 13 would be unnecessary.

The rigid backing 14 is made to serve as the support for the picture mount assemblage, and the frame 11 is made to serve as a mechanical clasp for the assemblage and also as a decorative border. As shown in Fig. 3, the picture frame comprises individual frame elements 17, 18, 19 annd 20 formed of resilient material, each of which is generally channel-shaped to be placed over a marginal portion of the picture mount assemblage, and each of which preferably has mitered ends as shown at 21 and 22 to form the corners of the assembled frame. Fig. 4 shows the preferred form of each of the frame elements in its relaxed condition prior to the assembly of same to the picture mount assemblage. Each of the frame elements has a relatively wide flat front flange 23, a side flange 24, and a relatively narrow rear flange 25 having an interior lip 25a. As shown in Figs. 2 and 5, the backing 14 has a recess 26 in its rear surface for each lip 25a of the frame elements. These recesses extend entirely across the backing 14 and are spaced a like amount from adjacent edges 14a and are parallel to said edges. When each frame element is applied to the picture mount assemblage, the lip 25a seats in the associated recess 26 so as to clasp the frame element to the mount assemblage. Under this condition, the front flange 23 lies flat against a front marginal portion of the glass facing 16. The side 24 of the frame element bears against the edge 14a of the backing and likewise against the edges of the mat 15 and the glass facing 16. It is to be noted that the interior lip 25a engages the recess 26 at corner 26a thereof.

In order to insure a tight fit of the frame elements and a closed miter joint at each corner of the assembled frame, certain dimensions are carefully ascertained. By making the distance from the side 24 of the frame element to the tip of lip 25a, designated in Fig. 4 as dimension A, less than the dimension designated as B in Fig. 5 which is the distance from corner 26a of recess 26 to the edge 14a of the backing, and by making the distance from the inside surface of flange 23 to the edge of lip 25a, designated in Fig. 4 as X, less than the distance from the bottom of recess 26 to the front of the glass facing 16, designated in Fig. 5 as Y, the tight corners and closed miters are assured. In one embodiment, the protrusion length of the lip 25a is made twice the depth of the recess 26. Thus, with a depth of $\frac{1}{32}$ of an inch, the protrusion length of the lip may be $\frac{1}{16}$ of an inch. The re-entrancy of lip 25a (that is the acute angle formed by lip 25a and flange 25) is in the order of 80°, and the acute angle formed by side 24 of the frame element and flange 25 is also in the order of 80°.

It will be apparent that the biasing of the edge of lip 25a by controlled dimensioning of distances B and Y disposes flange 23 and side 24 against the side edges and faces of the glass and against the edges of the backing 14. Thus, the flange 25 is stressed both in tension and in bending, with the resulting tight fit of the frame elements and the flush fit thereof at the mitered corner joints.

In applying the frame elements to the picture mount assembly, three of the frame elements may be applied successively simply by sliding each frame element along a marginal portion of the mount assemblage, with the lip 25a disposed in the associated recess 26. The fourth frame element is then applied in the manner shown in Fig. 6 by inserting the lip 25a in the associated recess 26 and forcing the frame element over the marginal portion of the picture mount assemblage. This is possible because each of the frame elements is formed of resilient material. As shown in Fig. 6, the fourth frame element is distorted as it is applied, but it springs back toward its normal condition when it is in place on the picture mount assemblage. Removal of the picture frame elements from the mount assemblage involves a reversal of this procedure. One of the frame elements is removed by forcing it off of the marginal portion of the mount assemblage as in Fig. 6, and then the remaining three picture elements are successively removed by sliding them off of the picture mount assemblage. It will be seen that the assembly and disassembly of the frame elements are easily accomplished with little effort and with no required skill on the part of the user. Moreover, the structure provided by the invention eliminates the use of nails or tape.

With respect to the composition and manufacture of the frame elements, any suitable material and any method of manufacture of these elements may be employed. Preferably the frame elements are formed of plastic material such as cellulose, butyrate or acetate butyrate. The latter is available commercially under the tradename, Tenite II. This material is chosen for its stability of dimension as well as its flexibility and its ability to be formed by a continuous extruding process. These plastic materials can be either clear or colored. Further, they can be plated by various techniques to give silver or gold finishes. It has been found that the vacuum plating technique or the silver reduction technique on plastic can give what is termed water-gilded burnished finish which is extremely desirable in the frame field.

With respect to the picture mount assemblage, the rigid backing 14 may be made of any suitable material such as stamped aluminum, moulded plastic, tempered masonite, etc. The backing may be cut, stamped or moulded to the desired size, and the recesses may be formed in the rear surface by milling or in any other suitable manner. The mat 15 may also be formed of any suitable material, such as starched cloth, linen, stiff paper, etc. The mat 15 may be provided with a small area of thin friction material, e. g. a ¼" disk of soft rubber in the order of 1/64" thick, in the vicinity of the picture. In the case shown in Fig. 1, where the picture is placed behind a window 13 in the mat, the friction area could be around the inner periphery of the mat or be placed on the backing 14. If the picture were to be mounted directly upon the mat, the frictional area could be provided directly upon the mat 15. The frictional holding of the picture, while generally not absolutely necessary, better secures the print or photo to the mount. Generally the print or photo can be held by the pressure of the glass on the mount.

It is generally desirable to provide some means on the rear of backing 14 to produce stand-off from a wall and consequent shadow effect when the picture mount is hung on a wall, and also to help rigidify the backing and to facilitate handling. For these purposes, two members 27 and 28 (Fig. 2) are fastened to the backing 14. If the backing is tempered masonite, these members may be formed of wood or any other suitable material, and they may be secured to backing 14 by means of glue or in any other suitable manner. Where possible, the said members may be formed integrally with the backing, as where the latter is formed of plastic material. Elements 29 and 30 are provided for hanging the picture mount on a wall, with the mount arranged either vertically or horizontally. The arrangement of the members 27 and 28 as shown substantially equalizes their weight on each side of the vertical axis of suspension whether the mount is arranged vertically or horizontally. Of course, any other arrangement may be provided on the rear of the backing for the desired purposes. Members 27 and 28 act to reinforce the backing 14 to further rigidify the same. They also provide a convenient stooling upon some flat surface for the backing when it is desired to hand assemble the frame elements. A further advantage of the members 27 and 28 is that they space the picture frame from the wall and provide a pleasing shadow effect. It will be apparent that additional reinforcing members can be applied to the backing if necessary.

It will be apparent that the present invention provides a complete frame assembly which has the various advantages hereinbefore set forth, pratically ease of mounting and framing a picture. While a preferred embodiment of the invention has been illustrated and described, the invention is not limited thereto but contemplates such modifications and further embodiments as may occur to those skilled in the art.

I claim:

1. A picture frame combination for assembly on a picture mount including a rigid backing, comprising individual frame elements formed of resilient material, each of said elements being channel-shaped to fit over a marginal portion of the picture mount, and having an inward projection at the edge of its rear flange disposed at an acute angle to said flange and adapted to engage a latching surface or shoulder on the backing, said elements having mitered ends to form the corners of the frame.

2. A picture frame combination for assembly on a picture mount including a rigid backing, comprising individual frame elements formed of resilient material, each of said elements being channel-shaped to fit over a marginal portion of the picture mount, and having a relatively wide flat front flange and a relatively narrow rear flange with an inward projecting at its edge to seat in a surface recess of the backing, said elements having mitered ends to form the corners of the frame.

3. A picture frame and mount combination, comprising a picture mount including a rigid backing having recesses in the rear surface thereof in proximity and parallel to its edges, each recess extending entirely across the backing, and individual frame elements formed of resilient material, each of said elements being channel-shaped to fit over a marginal portion of said picture mount, and having an inward projection on its rear flange to seat in one of the recesses of said backing, said elements having mitered ends to form the corners of the frame, said elements being assembled by sliding all but one onto marginal portions of the picture mount and then forcing the remaining element onto the remaining marginal portion of the picture mount.

4. A picture frame and mount combination, comprising a picture mount assembly including a rigid backing, a mat, and a glass facing, said backing having recesses in the rear surface thereof near its edges, and individual frame elements formed of resilient material, each of said elements being channel-shaped to fit over a marginal portion of said picture assembly, each of said elements having a flat side and a flat front flange in perpendicular relation to form a square front corner and to lie flat against an edge and the front face of the picture mount assembly, each of said elements also having a rear flange and an inwardly projection on the latter flange to seat in one of the recesses of said backing, said elements having mitered ends to form the corners of the frame.

5. A combination according to claim 4, wherein said mat has a frictional area for holding a picture in place.

6. A picture frame and mount combination, comprising a picture mount assembly including a rigid backing having recesses in the rear surface thereof in proximity and parallel to its edges, each recess being located at a predetermined distance from the proximate edge of the backing and being located at a predetermined distance from the front face of the mount assembly, and individual frame elements formed of resilient material, each of said elements being channel-shaped to fit over a marginal portion of said mount assembly, each of said elements having a flat side and a flat front flange in perpendicular relation to form a square front corner and to lie flat against an edge and the front face of the picture mount assembly, each of said elements also having a rear flange and an inward projection on the latter flange to seat in one of the recesses of said backing, the edge of the projection being located at distances from inner surfaces of the side and front flange respectively less than the first-mentioned distances when the frame element is in its free state, whereby application of each frame element to said mount assembly stresses the rear flange of the element to effect tight fit of the frame elements.

7. A combination according to claim 6, wherein the inward projection on each of said frame elements is of greater protrusion length than the depth of the associated backing recess.

References Cited in the file of this patent

UNITED STATES PATENTS

| | | |
|---|---|---|
| 1,481,120 | Brombosz | Jan. 15, 1924 |
| 2,280,907 | Fink | Apr. 28, 1942 |
| 2,403,491 | Bogia | July 9, 1946 |
| 2,521,411 | Rosenberg | Sept. 5, 1950 |